(12) United States Patent
Ono (10) Patent No.: US 9,524,645 B2
(45) Date of Patent: Dec. 20, 2016

(54) FILTERING DEVICE AND ENVIRONMENT RECOGNITION SYSTEM

(71) Applicant: FUJI JUKOGYO KABUSHIKI KAISHA, Tokyo (JP)

(72) Inventor: Hiroyuki Ono, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 14/477,675

(22) Filed: Sep. 4, 2014

(65) Prior Publication Data

US 2015/0091714 A1  Apr. 2, 2015

(30) Foreign Application Priority Data

Sep. 30, 2013  (JP) .................................. 2013-205390

(51) Int. Cl.
| | |
|---|---|
| G06K 9/00 | (2006.01) |
| G06T 15/00 | (2011.01) |
| G01C 3/14 | (2006.01) |
| G08G 1/16 | (2006.01) |

(52) U.S. Cl.
CPC ........... G08G 1/166 (2013.01); G06K 9/00791 (2013.01); G08G 1/165 (2013.01)

(58) Field of Classification Search
None
See application file for complete search history.

(56) References Cited

U.S. PATENT DOCUMENTS

2009/0237491 A1\* 9/2009 Saito ..................... G01C 11/06
348/47

FOREIGN PATENT DOCUMENTS

| JP | 3348939 B2 | 11/2002 |
|---|---|---|
| JP | 3349060 B2 | 11/2002 |
| JP | 3917285 B2 | 5/2007 |

\* cited by examiner

*Primary Examiner* — Randolph I Chu
(74) *Attorney, Agent, or Firm* — McDermott Will & Emery LLP (57) ABSTRACT

A filtering device includes an evaluation value deriving module that derives, for a pair of images having mutual relevance, multiple evaluation values indicative of correlations between any one of blocks (reference block) that is extracted from one of the images (reference image) and multiple blocks (comparison blocks) extracted from the other image (comparison image), an evaluation range setting module that sets an evaluation range of the evaluation values, the evaluation range having one of boundaries at the evaluation value with the highest correlation among the multiple evaluation values, and a difference value determining module that determines whether the evaluation value with the highest correlation is valid as a difference value based on the multiple evaluation values and the evaluation range.

13 Claims, 7 Drawing Sheets

FILTERING DEVICE AND ENVIRONMENT RECOGNITION SYSTEM

CROSS-REFERENCE TO RELATED APPLICATION

The present application claims priority from Japanese Patent Application No. 2013-205390 filed on Sep. 30, 2013, the entire contents of which are hereby incorporated by reference.

BACKGROUND

1. Technical Field

The present disclosure relates to a filtering device and an environment recognition system which determines, when calculating a difference value (parallax) of an object among multiple comparison targets, whether the difference value is valid.

2. Related Art

There are conventionally known a technique, such as collision avoidance control, which detects specific objects including another vehicle located ahead of a vehicle, and avoids a collision with a leading vehicle, and a technique, such as a cruise control, which controls so as to maintain an inter-vehicle distance with a leading vehicle at a safe distance (for instance, see Japanese Patent (JP-B) No. 3,349, 060).

Such a collision-avoidance control and cruise control derive a parallax by using so-called pattern matching, in order to acquire a relative distance from the vehicle, of an object located ahead the vehicle. The pattern matching acquires image data from, for example, each of two imaging devices of which viewpoints differ from each other. The pattern matching then extracts any one of blocks from an image (hereinafter, referred to as "the reference image") based on the image data generated by one of the imaging devices, and then searches a highly-correlated block from an image (hereinafter, referred to as "the comparison image") based on the image data generated by the other imaging device. Then, the pattern matching refers to imaging parameters, such as installed positions and focal lengths of the imaging devices, uses so-called a stereo method or a triangulation method to calculate relative distances of the object with respect to the imaging devices based on the derived parallax, and converts the calculated relative distances into three-dimensional (3D) positional information which contains a horizontal distance and a height of the object in addition to the calculated relative distances. Further, various recognition processing are performed using the 3D positional information. Note that the term "horizontal" as used herein refers to screen horizontal or lateral directions, and the term "vertical (described later)" as used herein refers to screen vertical directions.

The above-described pattern matching calculates the correlation of the block in the comparison image with the block in the reference image while horizontally shifting the target block of the comparison image, and then calculates differences (difference values) between coordinates of the block in the comparison image of which the correlation is highest and coordinates of the block in the reference image, as the parallax. However, in a case where similar patterns continue horizontally, the correlations hardly indicate differences between blocks even if the target block in the comparison image is changed or shifted, resulting in erroneous derivations of the parallaxes.

Therefore, for example, JP-B No. 3,348,939 discloses a technique that uses an evaluation function in the pattern matching, such as sum of absolute difference (SAD) which is obtained by integrating the differences in luminance between each pixel within one block in the comparison image and a corresponding pixel, located at the same position as the first pixel, within another block in the reference image. This technique determines whether the minimum value of the evaluation values (where the correlation becomes the highest value) satisfies a predetermined condition, for example, whether the minimum value is less than a predetermined fixed value. If the minimum value is less than the predetermined fixed value, the parallax of the target block is determined to be valid. Further, for example, JP-B No. 3,917,285 discloses a technique that calculates average values in luminance of pixels around respective blocks in the reference image and the comparison image, subtracts each average value from the luminance within the corresponding block to derive an evaluation value (i.e., average value difference matching). By using such evaluation functions, variations in the images between the reference image and the comparison image, as well as effects due to low-frequency noise can be reduced.

However, the technique disclosed in JP-B No. 3,348,939 which compares the minimum value of the evaluation values with the fixed value has a difficulty to determine a unified or common fixed value which can be used for the evaluation of the existence of the correlation under various environments. Moreover, in the technique disclosed in JP-B No. 3,917,285 using the average value difference matching, the evaluation value greatly varies depending on imaging conditions of the imaging devices, for example, a fogging state of a windshield in front of the imaging devices and/or brightness of the circumference environment, even if the comparing images are obtained under similar environments. Therefore, the parallax (difference value) to be invalidated has not been effectively excluded.

SUMMARY OF THE INVENTION

The present disclosure has been designed in consideration of the circumstances described above, and an object thereof is to provide a filtering device and an environment recognition system, that can effectively exclude a difference value to be invalidated by appropriately evaluating an evaluation value of an evaluation function.

According to one aspect of the present disclosure, a filtering device is provided, which includes an evaluation value deriving module that derives, for a pair of comparison targets having mutual relevance, multiple evaluation values indicative of correlations with any one of extracted parts extracted from one of the comparison targets and multiple extracted parts that are extracted from the other comparison target, respectively, an evaluation range setting module that sets an evaluation range of the evaluation values, the evaluation range having one of boundaries at the evaluation value with the highest correlation among the multiple evaluation values, and a difference value determining module that determines whether the evaluation value with the highest correlation is valid as a difference value based on the multiple evaluation values and the evaluation range.

The difference value determining module may determine that the evaluation value with the highest correlation is invalid as the difference value if a ratio of the evaluation values contained in the evaluation range to all the multiple evaluation values is greater than a threshold.

The difference value determining module may determine that the evaluation value with the highest correlation is invalid as the difference value if an area of a polygon formed with the evaluation values contained in the evaluation range is greater than a threshold, the polygon being formed so as to have the other boundary of the evaluation range as one side of the polygon.

The evaluation range setting module may change the evaluation range according to the evaluation value with the highest correlation.

The comparison target may be an image and the extracted part may be a block consisting of one or more pixels in the image.

The evaluation range setting module may change the evaluation range according to an average value of luminance of the pixels in a predetermined area of the image.

According to another aspect of the present disclosure, an environment recognition system is provided, which includes one or more imaging devices that generate a pair of images having mutual relevance, an evaluation value deriving module that derives, for the pair of generated images, multiple evaluation values indicative of correlations between any one of blocks that is extracted from one of the images and multiple blocks extracted from the other image, an evaluation range setting module that sets an evaluation range of the evaluation values, the evaluation range having one of boundaries at the evaluation value with the highest correlation among the multiple evaluation values, and a difference value determining module that determines whether the evaluation value with the highest correlation is valid as a parallax based on the multiple evaluation values and the evaluation range.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, a suitable example of the present disclosure will be described in detail with reference to the accompanying drawings. Dimensions, material, concrete numerical values, etc. illustrated in this example are merely instances for easier understanding of the present disclosure, and, unless otherwise particularly specified, those instances are not intended to limit the present disclosure. Note that, in this description and the accompanying drawings, elements having the substantially same function and configuration are denoted with the same reference numerals in order to omit redundant explanations, and any other elements which are not directly related to the present disclosure are not illustrated in the accompanying drawings.

In recent years, vehicles having so-called a collision avoidance function (adaptive cruise control: ACC) have been spreading. This function images the road environment ahead of a vehicle where on-board cameras are mounted, identifies an object, such as a leading vehicle, based on color information and/or positional information obtained from the images (comparison targets), and thereby avoiding a collision with the identified object and/or maintains an inter-vehicle distance with the leading vehicle at a safe distance.

In order to acquire the relative inter-vehicle distance of the object located ahead of the vehicle, the collision avoidance function uses, for example, two imaging devices of which viewpoints differ from each other to acquire a pair of comparison targets (i.e., a reference image and a comparison image) from each of the two imaging devices, then uses so-called pattern matching to compare the comparison image with the reference image and extracts a highly-correlated block (extracted part). However, when similar patterns continue in the horizontal directions of the image, the correlations do not vary between adjacent blocks even if the position of the target block in the comparison image is changed, resulting in possible erroneous derivations of the parallaxes (difference values). Therefore, the purpose of this example is to effectively exclude the parallaxes to be invalidated by determining whether the minimum value is valid as the parallax based on transitions of evaluation values in an evaluation function of the pattern matching, i.e., transitions around the minimum value of the evaluation values (where the value of the correlation becomes the highest). Note that the term "block" as used herein refers to a part comprised of one or more pixels in an image. Below, the environment recognition system for achieving such a purpose will be described, and a filtering device provided to a vehicle exterior environment recognition device that is a particular element of the system will be described in detail.

(Environment Recognition System 100)

Figure 1:
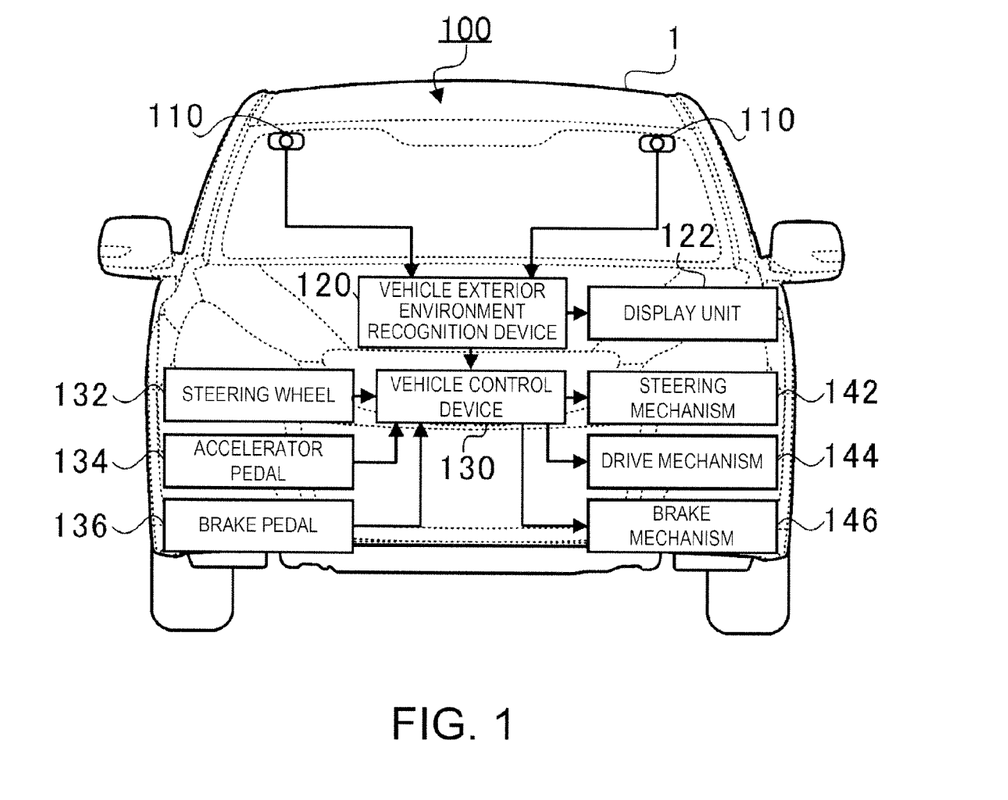
FIG. 1 is a block diagram illustrating a connecting relation of an environment recognition system.

FIG. 1 is a block diagram illustrating a connecting relation of an environment recognition system 100. The environment recognition system 100 is comprised of a pair of imaging devices 110 mounted inside a vehicle 1 (hereinafter, simply referred to as "the vehicle"), a vehicle exterior environment recognition device 120, and a vehicle control device 130 (which is typically comprised of an electronic control unit (ECU)).

Each imaging device 110 is comprised of image elements, such as charge-coupled devices (CCDs) or complementary metal-oxide semiconductors (CMOSs). Each imaging device 110 can image the environment ahead of the vehicle 1 to generate a color image consisting of three hues (R (red), G (green), and B (blue)) or a monochrome image. Note that the color image imaged by the imaging device 110 is adopted as the luminance image to distinguish it from a distance image described later.

Moreover, the two imaging devices 110 are mounted so as to be separated from each other in substantially lateral or horizontal directions such that they are oriented facing to the traveling direction of the vehicle 1 to have their optical axes being oriented substantially parallel to each other. Each imaging device 110 sequentially generates image data which is obtained by imaging objects existing within a detection area ahead of the vehicle 1 per frame, for example, at every 1/60 seconds (i.e., 60 fps). Note that the term "object" to be recognized as used herein refers not only a solid object existing independently, such as a vehicle, a pedestrian, a traffic light, a road surface (traveling path), a guardrail, and a building, but also an object that can be identified as part of the solid object, such as a taillight, a blinker, each illuminating part of the traffic light. Each functional module described below carries out processing for every frame, triggered by a refreshing of such image data.

The vehicle exterior environment recognition device 120 acquires image data from each of the two imaging devices 110, derives the parallax using so-called pattern matching, and associates the derived parallax information (corresponding to a relative distance described later) with the image data to generate a distance image. The pattern matching will be described later in detail. Further, the vehicle exterior environment recognition device 120 uses the luminance based on the luminance image and three-dimensional (3D) positional information in real space containing the relative distances with respect to the vehicle 1 based on the distance image to group blocks, of which the luminance are equal and the 3D positional information are close to each other, as one unitary object, and then identifies specific objects to which the object in the detection area ahead of the vehicle 1 corresponds.

When the specific object is identified, the vehicle exterior environment recognition device 120 derives a relative speed and the like of the specific object (for example, leading vehicle) while tracking the specific object, and then determines whether a possibility of the specific object colliding with the vehicle 1 is high. Here, if the vehicle exterior environment recognition device 120 determines that the possibility of a collision is high, the vehicle exterior environment recognition device 120 then gives (informs) a vehicle operator a warning indication through a display unit 122 installed in front of the operator, and outputs information indicative of the warning to the vehicle control device 130.

The vehicle control device 130 accepts operational inputs of the operator through a steering wheel 132, an accelerator (gas pedal) 134, and a brake pedal 136, and transmits the inputs to a steering mechanism 142, a drive mechanism 144, and a brake mechanism 146, respectively, to control the vehicle 1. The vehicle control device 130 also controls the drive mechanism 144 and the brake mechanism 146 according to instructions from the vehicle exterior environment recognition device 120.

Next, a configuration of the vehicle exterior environment recognition device 120 will be described in detail. Note that processing for obtaining the parallax of the object by the filtering device, which is a feature of this example, will be described in detail herein and, thus description of any other configurations unrelated to the feature of this example will be omitted.

(Vehicle Exterior Environment Recognition Device 120)

Figure 2:
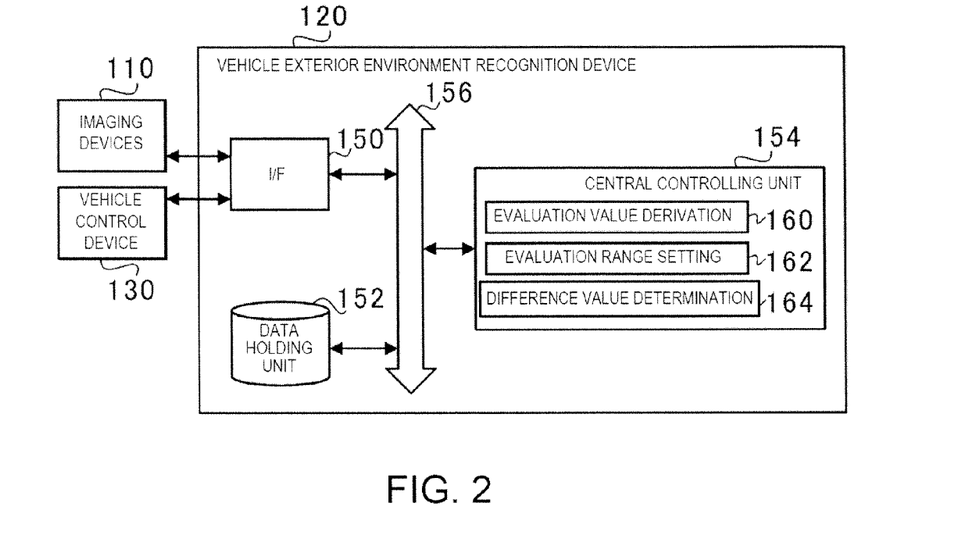
FIG. 2 is a functional block diagram schematically illustrating functions of a vehicle exterior environment recognition device.

FIG. 2 is a functional block diagram schematically illustrating functions of the vehicle exterior environment recognition device 120. As illustrated in FIG. 2, the vehicle exterior environment recognition device 120 is comprised of an I/F unit 150, a data holding unit 152, and a central controlling unit 154.

The I/F unit 150 is an interface that performs bidirectional information exchanges with the imaging devices 110 and the vehicle control device 130. The data holding unit 152 is comprised of one ore more RAMs, one ore more flash memories, one ore more HDDs, etc. to hold various information required for the processing of each functional module described below, and temporarily holds the image data received from the imaging devices 110.

The central controlling unit 154 is comprised of one ore more integrated circuits containing one ore more central processing units (CPUs), one ore more ROMs where one or more programs and the like are stored, or one or more RAMs as work areas, and controls the I/F unit 150, the data holding unit 152, etc. through a system bus 156. In this example, the central controlling unit 154 also functions as an evaluation value deriving module 160, an evaluation range setting module 162, and a difference value determining module 164 in this example. In addition, the evaluation value deriving module 160, the evaluation range setting module 162, and the difference value determining module 164 also function as the filtering device. Next, the pattern matching processing will be described in detail.

(Pattern Matching Processing)

The evaluation value deriving module 160 acquires the image data from each of the two imaging devices 110. The evaluation value deriving module 160 then derives a evaluation values based on the acquired two pieces of image data, which have mutual relevance. Specifically, the evaluation value deriving module 160 extracts any one of blocks from one of the images (reference image) to be used as a reference, and extracts a multiple blocks from the other image (comparison image) to be used as a comparison target. The evaluation value deriving module 160 then derives the multiple evaluation values indicative of correlations between the reference block and the respective comparison blocks.

The pattern matching may be a comparison in luminance (Y color-difference signal) per block between the pair of images. For example, the pattern matching includes approaches, such as a sum of absolute difference (SAD) in which a difference in luminance is calculated, a sum of squared intensity difference (SSD) which uses values obtained by squaring the differences, and a normalized cross correlation (NCC) which uses similarities of variances obtained by subtracting an average value of the luminance of pixels from the luminance of each pixel. Among these, SAD will be particularly described herein as an instance. In this example, average value difference matching is also performed. This average value difference matching calculates an average value of the luminance of pixels around a block in the reference image and the comparison image, respectively, and subtracts each average value from the luminance of the pixels within the block to derive evaluation values. Next, the average value difference matching will be described in detail.

Figure 3A:
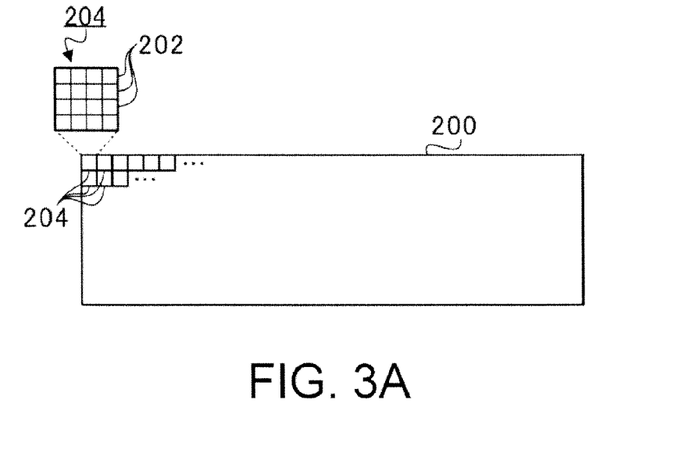
FIGS. 3A to 3C illustrate average value difference matching.
Figure 3B:
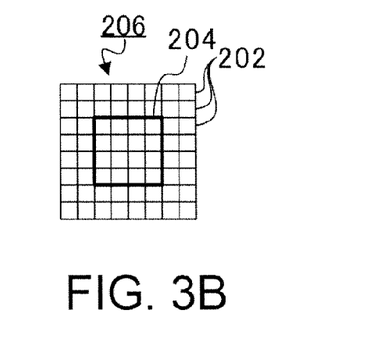
Figure 3C:
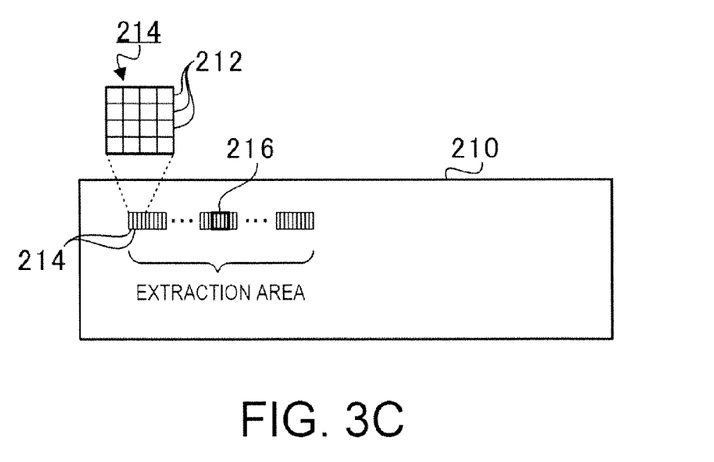

FIGS. 3A to 3C illustrate the average value difference matching. As illustrated in FIG. 3A, the evaluation value deriving module 160 first extracts a block 204 (hereinafter, referred to as "the reference block") comprised of a matrix of pixels 202, for example, consisting of 4 pixels in the horizontal directions×4 pixels in the vertical directions, from the reference image 200. The evaluation value deriving module 160 sequentially repeats the processing per block, by extracting another reference block 204 and deriving the parallax for each extracted reference block 204. While the reference block 204 is comprised of 4 pixels in the horizontal directions×4 pixels in the vertical directions in this example; any number of pixels within the reference block 204 may be selected.

One reference block 204 is extracted so as not to overlap with another adjacent reference block 204. In this example, the adjacent reference blocks 204 are extracted, and thus all 6,750 blocks (150 blocks in the horizontal directions×45 blocks in the vertical directions) are sequentially extracted as the reference block 204, for all the pixels 202 displayed within the detection area (for example, 600 pixels in the horizontal directions×180 pixels in the vertical directions).

Since the average value difference matching is adopted in this example as described above, the evaluation value deriving module 160 calculates, as illustrated in FIG. 3B, an average value Ab of luminance Rb(i, j) of the pixels 202 within an area 206 represented by 8 pixels in the horizontal directions×8 pixels in the vertical directions around the reference block 204 centering on the reference block 204 based on the following Equation 1:

$$Ab = \Sigma Rb(i,j)/64 \quad \text{(Equation 1)}$$

Note that "i" is a horizontal pixel position in the area 206 (i=1 to 8 and "j" is a vertical pixel position in the area 206 (j=1 to 8). If the area 206 is partially located outside the reference image 200 (i.e., the area 206 is partially missing at an end of the reference image 200), the average value Ab is calculated while the missing part is omitted.

The evaluation value deriving module 160 then subtracts the above-described average value Ab from the luminance Eb(i, j) of the pixels 202 within the reference block 204 to derive an average value difference luminance EEb(i, j) as the following Equation 2:

$$EEb(i,j) = Eb(i,j) - Ab \quad \text{(Equation 2)}$$

Note that "i" is a horizontal pixel position within the reference block 204 (i=1 to 4), and "j" is a vertical pixel position within the reference block 204 (j=1 to 4).

The evaluation value deriving module 160 then extracts a block 214 (hereinafter, referred to as "the comparison block") represented by the matrix of pixels 212, for example, of 4 pixels in the horizontal directions×4 pixels in the vertical directions from the comparison image 210, as illustrated in FIG. 3C. Note that the evaluation value deriving module 160 sequentially extracts, for each one of the reference blocks 204, multiple comparison blocks 214, and derives the evaluation values indicative of correlations with the respective reference blocks 204.

The comparison block 214 is shifted by, for example, 1 pixel at a time in the horizontal direction and then extracted and, thus, the pixels of the adjacent comparison blocks 214 are overlapped. In this example, the total of 128 comparison blocks 214 to the left and right in the horizontal direction are extracted, for each one of the reference blocks 204, with respect to a position 216 corresponding to the reference block 204. Therefore, the extraction area (search area) has 131 pixels (=128+3 pixels) in the horizontal directions×4 pixels in the vertical directions. The positional relationship between the position 216 corresponding to the reference block 204 and the extraction area is set according to the appearing pattern of the parallaxes between the reference image 200 and the comparison image 210.

Since the average value difference matching is adopted in this example as described above, the evaluation value deriving module 160 calculates an average value Ac of luminance Rc(i, j) of pixels within an area represented by 8 pixels in the horizontal directions×8 pixels in the vertical directions around the comparison block 214 centering on the comparison block 214 based on the following Equation 3, similar to the reference block 204:

$$Ac = \Sigma Rc(i,j)/64 \quad \text{(Equation 3)}$$

Note that "i" is a horizontal pixel position within the area (i=1 to 8), and "j" is a vertical pixel position within the area (j=1 to 8).

Next, the evaluation value deriving module 160 subtracts the above-described average value Ac from luminance Ec(i, j) of each of the pixels within the comparison block 214 to derive an average value difference luminance EEc(i, j), as the following Equation 4:

$$EEc(i,j) = Ec(i,j) - Ac \quad \text{(Equation 4)}$$

Note that "i" is a horizontal pixel position within the comparison block 214 (i=1 to 4), and "j" is a vertical pixel position within the comparison block 214 (j=1 to 4).

Next, the evaluation value deriving module 160 subtracts, from the average value difference luminance EEb(i, j) of each pixel 202 of the reference block 204, the average value difference luminance EEc(i, j) of each pixel 212 corresponding to the same position in the comparison block 214, and integrates the subtraction results to derive an evaluation value S, as illustrated in the following Equation 5:

$$S = \Sigma(EEb(i,j) - EEc(i,j)) \quad \text{(Equation 5)}$$

Thus, the multiple derived evaluation values S have higher correlations as the evaluation values S themselves have smaller values, i.e., smaller differences. Therefore, among the multiple evaluation values (here, 128 evaluation values) of one reference block 204 with the comparison block 214, the position of the minimum evaluation value (minimum value), serves as a candidate of the position indicating an end of the parallaxes.

When the minimum value of the evaluation values for any reference block 204 is derived, the evaluation value deriving module 160 holds, in a predetermined area of the data holding unit 152, a difference between coordinates of the comparison block 214 corresponding to the minimum value and coordinates of the reference block 204 (the position 216 corresponding to the reference block 204) as the parallax. Therefore, the data holding unit 152 holds the parallaxes of 6,750 reference blocks 204 (=150 blocks in the horizontal directions×45 blocks in the vertical directions).

The above-described average value difference matching only uses high-frequency components of the images for the matching, and can remove low-frequency noise because it has an equivalent function to a high-pass filter. In addition, the matching has high accuracy of identifying the parallaxes and thus can improve accuracy of deriving the parallaxes, even under the effects of slight imbalances in luminance between the reference image 200 and the comparison images 210, and the effects of gain variations due to aging of the cameras (imaging devices) and/or analog circuit components.

Figure 4:
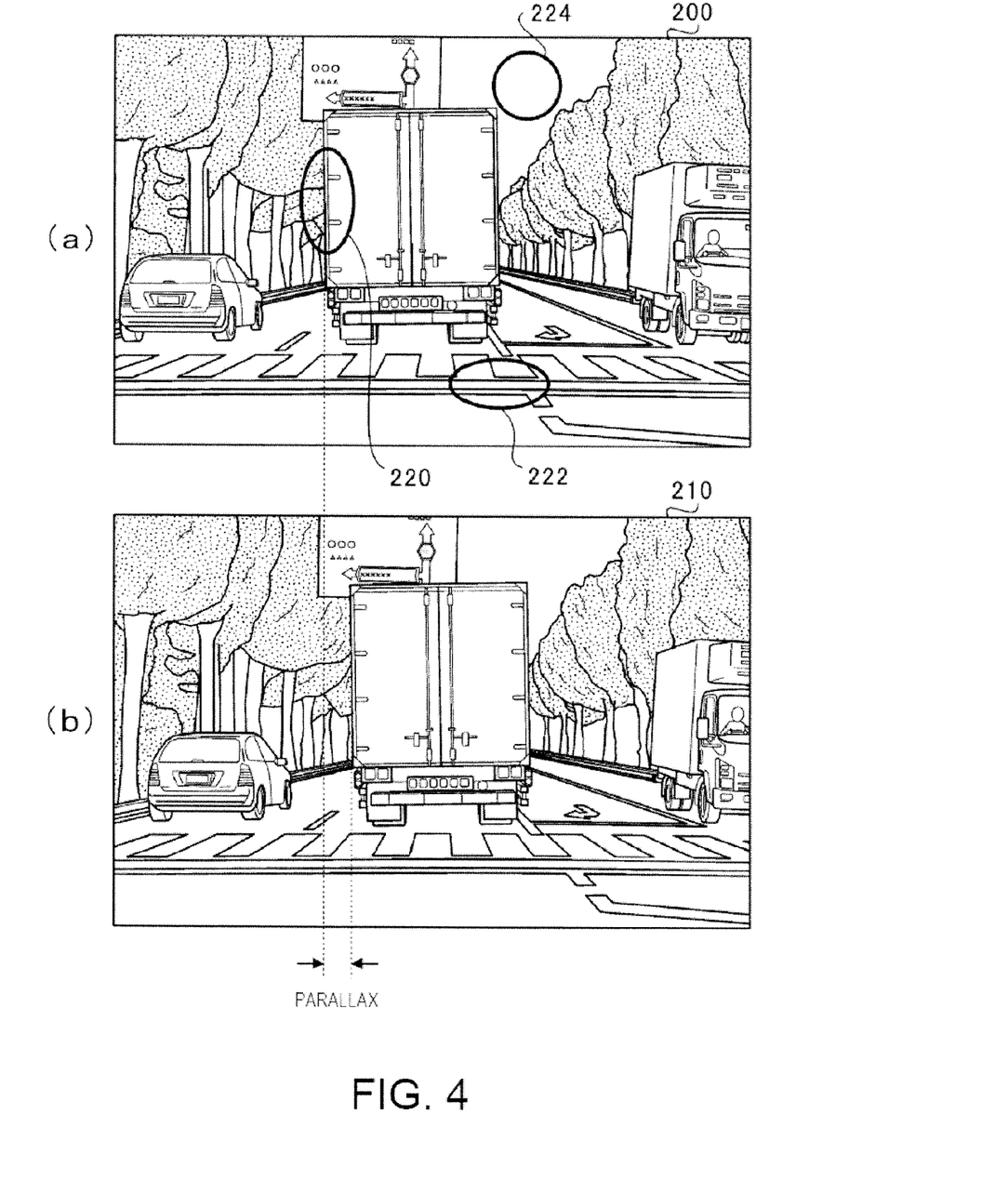
FIG. 4 illustrates a reference image and a comparison image.

FIG. 4 illustrates the reference image 200 and the comparison image 210. The upper part (a) of FIG. 4 illustrates the image from one of the imaging devices 110 located on the right, while the lower part (b) illustrates the corresponding image from the other imaging device 110 located on the left. In this example, the right image is used as the reference image 200, and the left image is used as the comparison image 210.

When the evaluation value deriving module 160 derives the evaluation values based on the reference image 200 and the comparison image 210, it is easy to derive the parallaxes and perform the pattern matching because an edge appears at a side end of a track in an area 220 illustrated in the upper part (a) of FIG. 4.

On the other hand, if similar patterns continue horizontally like white lines of a pedestrian crossing in an area 222 illustrated in the upper part (a) of FIG. 4, the parallaxes may be erroneously derived since the correlation does not vary much between the blocks even if the positions of the blocks in the comparison image 210 are different from the blocks of the reference image 200. Similarly, like the background, such as the sky, in an area 224 illustrated in the upper part (a) of FIG. 4, the correlation does not vary much between the blocks in the area where similar features continue horizontally and, thus, the parallaxes may be erroneously derived as well. Other than the situations described above, a similar situation where the parallaxes cannot be identified may also be caused when occlusion occurs.

Figure 5A:
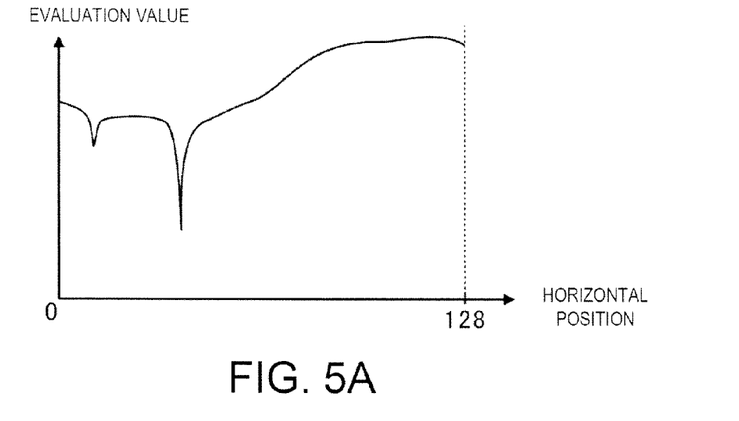
FIGS. 5A to 5C are graphs illustrating transitions of evaluation values in three arbitrary areas.
Figure 5B:
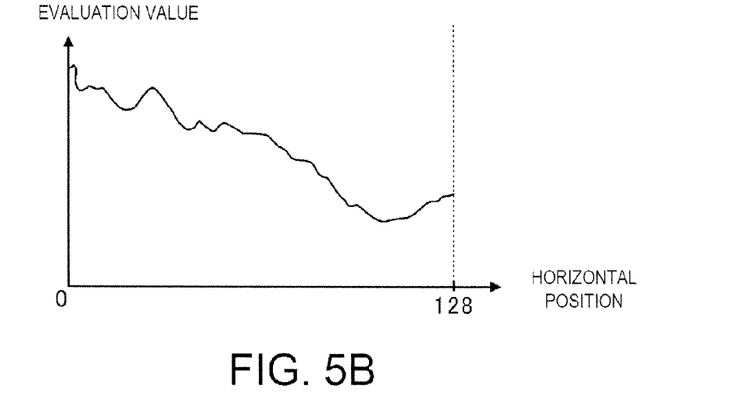
Figure 5C:
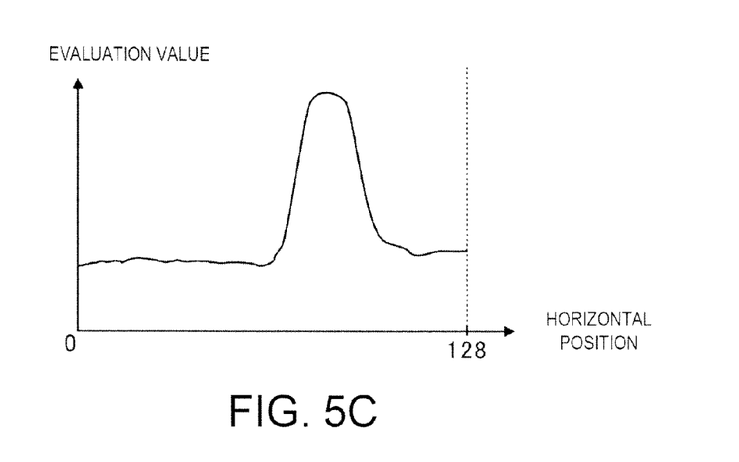

FIGS. 5A to 5C are graphs illustrating transitions of the evaluation values in the three areas 220, 222 and 224 described above. FIG. 5A illustrates an instance of one reference block 204 in the area 220, FIG. 5B illustrates an instance of one reference block 204 in the area 222, and FIG. 5C illustrates an instance of one reference block 204 in the area 224. In FIGS. 5A to 5C, the horizontal axis represents the horizontal position of the comparison block 214, and the vertical axis indicates the evaluation value. Smaller evaluation values indicate higher correlations.

In FIG. 5A, since the blocks compared in the area 220 are characteristic, the evaluation value is outstanding locally toward a smaller value and, thus, a minimum value appears clearly. On the other hand, in FIGS. 5B and 5C, minimum values of the evaluation value corresponding to the pattern matching appear as well; however, other similar evaluation values appear near the minimum values, respectively.

For this reason, in this example, the minimum value is determined to be valid as the parallax, focusing on the transition of the evaluation value of the pattern matching, i.e., the shape of the transition around the minimum value of the evaluation values (a value where the correlation becomes the highest). Specifically, if other evaluation values do not appear near the minimum value, the minimum value is determined to be valid as the parallax, and, on the other hand, other evaluation values appear near the minimum value, the minimum value is determined to be invalid. Next, this processing will be described in detail.

Figure 6A:
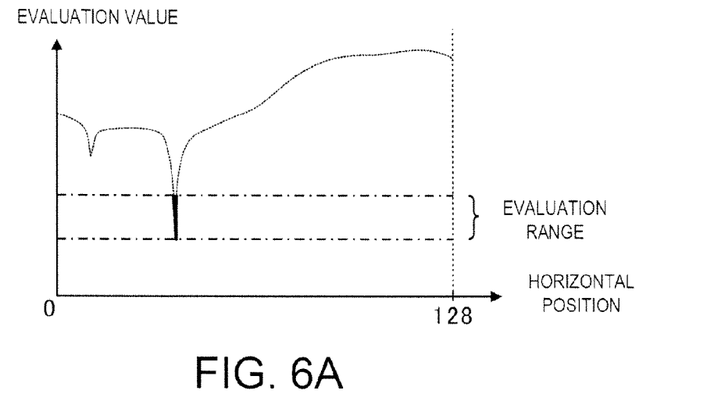
FIGS. 6A to 6C are graphs illustrating processing for determining the evaluation values.
Figure 6B:
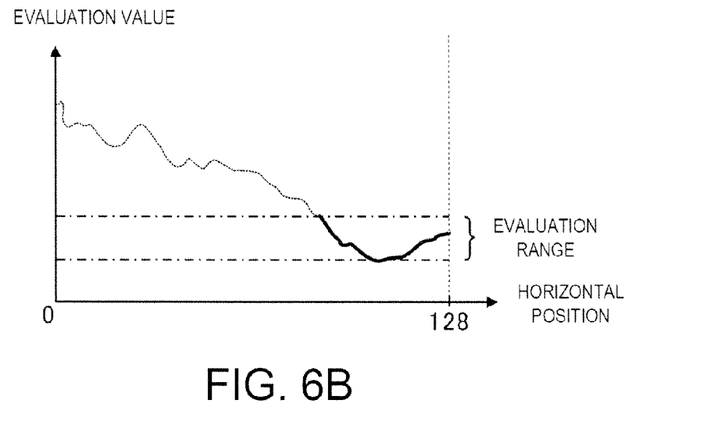
Figure 6C:
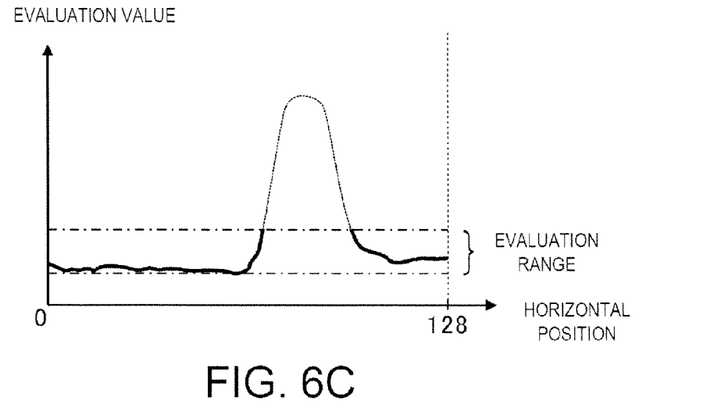

FIGS. 6A to 6C are graphs illustrating the processing for determining the evaluation value. Note that FIGS. 6A to 6C correspond to FIGS. 5A to 5C, respectively. The evaluation range setting module 162 sets an evaluation range of the evaluation value from the minimum value among the multiple evaluation values (here, 128 evaluation values) (i.e., the evaluation value with the highest correlation) as one of boundaries (lower boundary) of the evaluation range so that the evaluation range has a certain width toward higher values (toward lower correlations) from the lower boundary. Here, the width or the size of the evaluation range is conveniently fixed as illustrated in FIGS. 6A to 6C. In FIGS. 6A to 6C, since one of the boundaries of the evaluation range corresponds to the minimum value, one can understand that the positions (heights in the graphs) of the evaluation range differ according to the transitions of the evaluation values.

The difference value determining module 164 determines whether the evaluation value with the highest correlation is valid as the parallax based on the multiple evaluation values and the evaluation range. For example, the difference value determining module 164 determines, for all the multiple evaluation values, whether the evaluation value with the highest correlation is valid as the parallax based on a ratio of the evaluation values contained within the evaluation range.

Specifically, suppose that the minimum value of the evaluation values is Min and the width of the evaluation range is W, the number of times N when the evaluation value K satisfies the following Equation 6 is counted:

$$K<(Min+W) \qquad \text{(Equation 6)}$$

If the counted number N is greater than a threshold, the difference value determining module 164 concludes that the minimum value has low reliability to be the parallax and that the minimum value is invalid as the parallax. Note that the threshold is determined by multiplying the number of comparison blocks 214 (i.e., 128 blocks) by a predetermined ratio (for example, 20%).

Alternatively, the difference value determining module 164 may determine whether the evaluation value with the highest correlation is valid as the parallax based on a polygonal area formed by the evaluation values contained in the evaluation range where one side of the polygon is formed by the other boundary of the evaluation range, instead of using the ratio of the evaluation value contained in the evaluation range.

Figure 7:
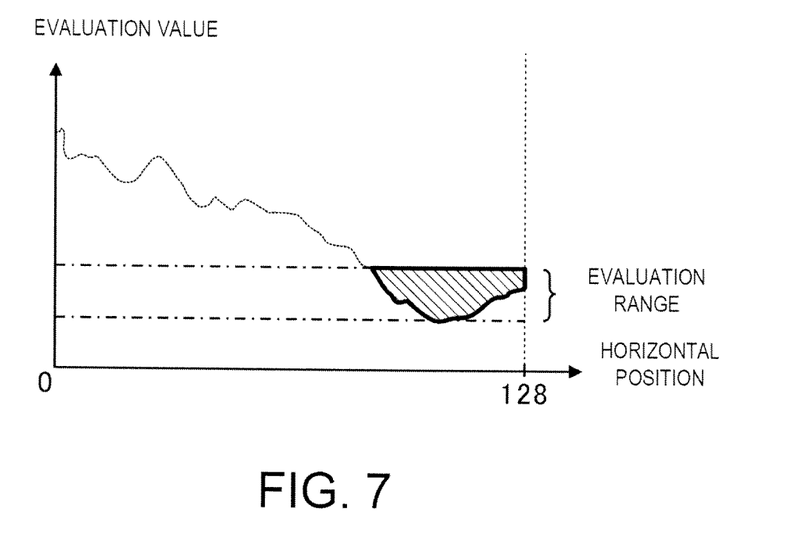
FIG. 7 is a graph illustrating another processing for determining the evaluation value.

FIG. 7 is a graph illustrating other processing for determining the evaluation values. FIG. 7 corresponds to FIG. 6B. The evaluation range setting module 162 connects adjacent evaluation values contained in the evaluation range among the multiple evaluation values (here, 128 evaluation values), also connects a boundary different from the minimum value of the evaluation values in the evaluation range, to form the polygon illustrated by hatching in FIG. 7. If the polygon area is greater than the threshold, the difference value determining module 164 concludes that the evaluation value with the highest correlation is invalid as the parallax. The transition of the evaluation value near the minimum value can also be determined by using such an area.

In the above, the width of the evaluation range is temporarily fixed; however, the evaluation range setting module 162 may also adaptively change the evaluation range. For example, the evaluation range setting module 162 changes the evaluation range according to an average value of luminance of pixels within a predetermined area of the reference image 200 or the comparison image 210. Note that the predetermined area may be set variously, such as the entire image, an area having a predetermined size at a predetermined position, and an extracted area from the comparison image 210.

Specifically, if the average value of the luminance of the pixels within the predetermined area is low, the evaluation range setting module 162 sets the evaluation range smaller, and, on the other hand, if the average value is high, the evaluation range setting module 162 sets the evaluation range larger. This is because, in a situation where the luminance is entirely low, for example, during twilight time and at night, the luminance values on the image become entirely low, and the evaluation value does not change much near the minimum value. Therefore, if the evaluation range is fixed, the parallaxes which are unintentionally excluded may increase.

Alternatively, the evaluation range setting module 162 may change the evaluation range according to the evaluation value with the highest correlation. For example, suppose that the minimum value of the evaluation values is Min, the maximum value of the evaluation value is Max, the scale of the evaluation value is Scale, and the counting number is Gain (any value), the width W of the evaluation range is set based on following Equation 7 or 8:

$$W=\text{Min} \times \text{Gain}/\text{Scale} \qquad \text{(Equation 7)}$$

$$W=(\text{Max}-\text{Min}) \times \text{Gain}/\text{Scale} \qquad \text{(Equation 8)}$$

By determining the width W of the evaluation range by using Equation 7 or 8, the evaluation range can be set according to the minimum value and the scale of the evaluation value. Therefore, the shape of the transition of the evaluation value can be appropriately determined.

As described above, the evaluation range that is relatively changed not based on a fixed value but based on the minimum value is used as the determination criterion in this example. Therefore, even if the luminance is varied depending on the fogging state of the windshield in front of the imaging devices 110 and/or the brightness of the circumference environment, the parallaxes to be invalidated can be effectively excluded.

In addition, the tendency of the evaluation value can be determined based on the entire shape of the transition of the evaluation value by using the multiple points near the minimum value (the transition itself), without using the minimum value of the evaluation values only as the evaluation criterion. Thus, the parallaxes to be invalidated, which can be determined due to the fact that they have no local depression of the evaluation value, can be reliably excluded.

In addition, one ore more programs that cause one or more computers to function as the filtering device and/or the environment recognition system described above, and one or more storage media, such as one or more flexible discs, one or more magneto-optic discs, one or more ROMs, one or more CDs, one or more DVDs, and one or more BDs, which record the program(s) and can be read by one ore more computer, are also provided. Note that the term "program" as used herein refers to a data set that is described with any of known languages and any of known describing methods.

As described above, although the suitable example of the present disclosure is described with reference to the accompanying drawings, the present disclosure is not intended to be limited to this example. It is apparent that a person skilled in the art can reach various kinds of changes and/or modifications without departing from the scope of the appended claims, and it should be understood that those changes and/or modifications naturally encompass the technical scope of the present disclosure.

For example, in the example described above, the pair of images simultaneously imaged by the two imaging devices 110 having different viewpoints, as comparison targets. However, the present disclosure is widely applicable to a pair of images having mutual relevance, without limiting to the case of this example. Such a pair of images having mutual relevance includes, for example, two images sequentially outputted from one imaging device (e.g., a monocular camera) which captured the images at different timings (which are processing targets of so-called an optical flow), and a combination of the captured imaged and an image prepared in advance (which is processing targets of so-called template matching). Further, the "parallax" between the pair of images which are simultaneously imaged by the two imaging devices 110 having different viewpoints is used as the difference value in the example described above. However, the difference value may be any difference between corresponding extracted parts, such as a difference between the reference blocks in the pair of images having mutual relevance, without limiting to the example described above.

Further, the luminance images are used as the comparison targets and the evaluation values are derived based on the luminance of the luminance image in the example described above. However, the evaluation values may be derived based on information other than the luminance, for example, heat distribution acquired by a far-infrared camera, distribution of reflection intensities acquired by laser radar, millimeter wave radar, etc., by using the information as the comparison targets, without limiting to the luminance. Also in such cases, the difference value may similarly be the difference between the corresponding extracted parts.

The present disclosure is applicable to the filtering device and the environment recognition system which determine, when the difference values (parallaxes) of the object in the multiple images are calculated, whether the difference values are valid.

The invention claimed is:

1. A filtering device, comprising:
an evaluation value deriving module that derives, for a pair of comparison targets having mutual relevance, multiple evaluation values indicative of correlations with any one of extracted parts extracted from one of the comparison targets and multiple extracted parts that are extracted from the other comparison target, respectively;
an evaluation range setting module that sets an evaluation range of the evaluation values, the evaluation range having one of boundaries at the evaluation value with the highest correlation among the multiple evaluation values; and
a difference value determining module that determines whether a difference value for the evaluation value with the highest correlation is valid as the difference value based on the multiple evaluation values and the evaluation range.

2. The filtering device of claim 1, wherein the difference value determining module determines that the evaluation value with the highest correlation is invalid as the difference value if a ratio of the evaluation values contained in the evaluation range to all the multiple evaluation values is greater than a threshold.

3. The filtering device of claim 1, wherein the difference value determining module determines that the evaluation value with the highest correlation is invalid as the difference value if an area of a polygon formed with the evaluation values contained in the evaluation range is greater than a threshold, the polygon being formed so as to have the other boundary of the evaluation range as one side of the polygon.

4. The filtering device of claim 1, wherein the evaluation range setting module changes the evaluation range, according to the evaluation value with the highest correlation.

5. The filtering device of claim 2, wherein the evaluation range setting module changes the evaluation range according to the evaluation value with the highest correlation.

6. The filtering device of claim 3, wherein the evaluation range setting module changes the evaluation range according to the evaluation value with the highest correlation.

7. The filtering device of claim 1, wherein the comparison target is an image and the extracted part is a block consisting of one or more pixels in the image.

8. The filtering device of claim 2, wherein the comparison target is an image and the extracted part is a block consisting of one or more pixels in the image.

9. The filtering device of claim 3, wherein the comparison target is an image and the extracted part is a block consisting of one or more pixels in the image.

10. The filtering device of claim 7, wherein the evaluation range setting module changes the evaluation range according to an average value of luminance of the pixels in a predetermined area of the image.

11. The filtering device of claim 8, wherein the evaluation range setting module changes the evaluation range according to an average value of luminance of the pixels in a predetermined area of the image.

12. The filtering device of claim 9, wherein the evaluation range setting module changes the evaluation range according to an average value of luminance of the pixels in a predetermined area of the image.

13. An environment recognition system, comprising:
one or more imaging devices configured to generate a pair of images having mutual relevance;
one or more processors, configured to:
derive, for the pair of generated images, multiple evaluation values indicative of correlations between any one of blocks that is extracted from one of the images and multiple blocks extracted from the other image;
set an evaluation range of the evaluation values, the evaluation range having one of boundaries at the evaluation value with the highest correlation among the multiple evaluation values; and
determine whether a parallax for the evaluation value with the highest correlation is valid as the parallax based on the multiple evaluation values and the evaluation range.

* * * * *